(12) United States Patent
Van Mill et al.

(10) Patent No.: US 8,967,727 B2
(45) Date of Patent: Mar. 3, 2015

(54) GRAVITY WAGON WITH DISCHARGE CHUTE AND KICKBACK

(75) Inventors: Michael Van Mill, Shell Rock, IA (US); John Walvatne, Parkersburg, IA (US); Daryl Rubner, Strawberry Point, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 13/539,798

(22) Filed: Jul. 2, 2012

(65) Prior Publication Data

US 2014/0001818 A1    Jan. 2, 2014

(51) Int. Cl.
*B62D 33/02* (2006.01)
*B60P 1/42* (2006.01)
*B60P 1/40* (2006.01)

(52) U.S. Cl.
USPC .............................................. 298/7; 105/280

(58) Field of Classification Search
USPC .......... 298/7, 18, 27; 414/548, 439, 467, 549; 105/250, 280, 247–253, 239, 282.1, 105/282.3, 305, 386
See application file for complete search history.

(56) References Cited

U.S. PATENT DOCUMENTS

| | | | | | |
|---|---|---|---|---|---|
| 2,730,964 | A | * | 1/1956 | Garlock | 105/248 |
| 2,772,919 | A | * | 12/1956 | Jones | 298/30 |
| 3,265,253 | A | * | 8/1966 | Niewold | 222/328 |
| 3,700,283 | A | * | 10/1972 | Birdsall | 298/7 |
| 4,024,939 | A | * | 5/1977 | Grieshop et al. | 193/5 |
| 4,846,621 | A | * | 7/1989 | Warsaw | 414/526 |
| 5,100,281 | A | * | 3/1992 | Grieshop | 414/526 |
| 5,324,097 | A | * | 6/1994 | Decap | 298/35 M |
| 5,980,189 | A | * | 11/1999 | Rubner | 414/505 |
| 6,615,976 | B2 | * | 9/2003 | Maguire | 198/833 |
| 7,134,830 | B2 | * | 11/2006 | Wood | 414/523 |
| 7,350,872 | B2 | * | 4/2008 | Wood | 298/18 |
| 2010/0068021 | A1 | * | 3/2010 | Petersen et al. | 414/523 |

* cited by examiner

*Primary Examiner* — Glenn Dayoan
*Assistant Examiner* — Sunsurraye Westbrook
(74) *Attorney, Agent, or Firm* — Rothwell, Figg, Ernst & Manbeck, P.C.

(57) ABSTRACT

A gravity wagon includes a container for storing grain or other material and a discharge for allowing material to exit the hopper via gravity. A discharge chute and kickback are used to direct the material from the discharge and are coupled via a linkage such that they can be positioned to direct the material exiting the hopper to an area generally to the side of the hopper in a first position or an area generally towards the center of the hopper in a second position. The movement of the discharge chute and the kickback between the first and second positions is facilitated by a pusher or pushing member coupled to the kickback.

23 Claims, 5 Drawing Sheets

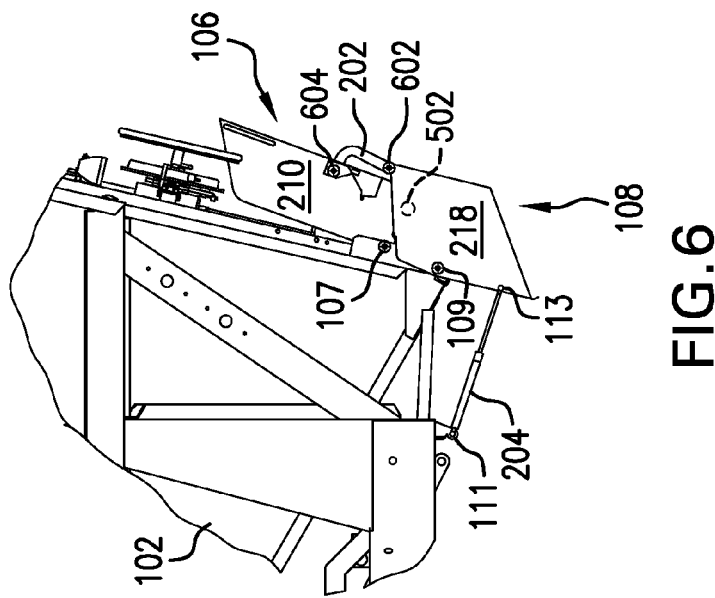
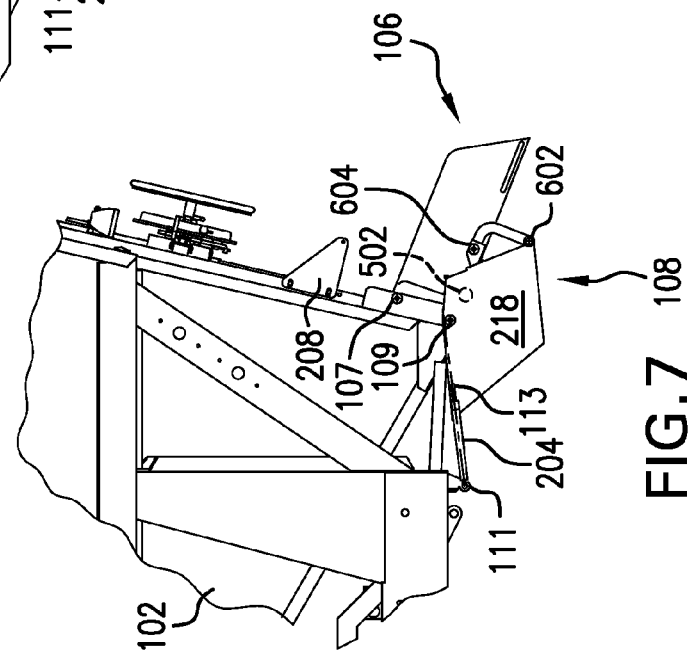
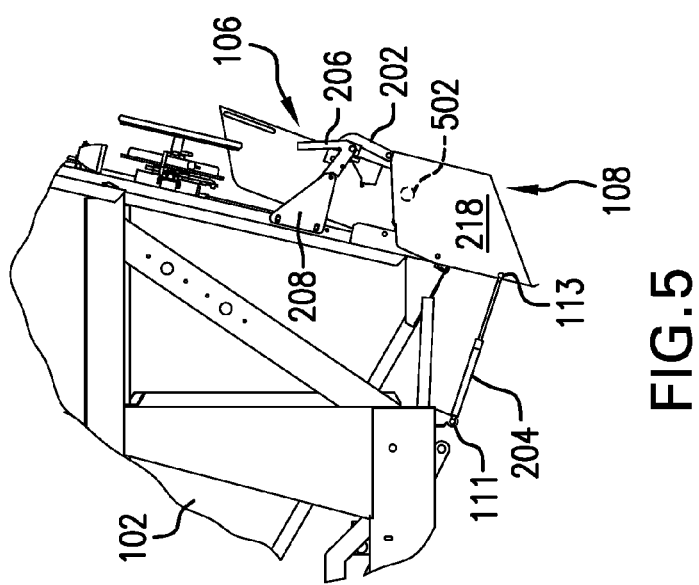

GRAVITY WAGON WITH DISCHARGE CHUTE AND KICKBACK

BACKGROUND OF THE INVENTION

1. Field of the Invention

The present invention relates generally to a system for discharging material from a storage container, and, more specifically, to a novel chute and kickback arrangement for discharging grain or other materials from a gravity wagon.

2. Discussion of the Related Art

Farm implements, such as grain carts, seed tenders and header transports, improve harvesting efficiency in many ways. For example, grain carts allow grain to be transported from harvesting equipment in the field to trucks or wagons at the side of the field, while the harvesting equipment continues to harvest. One type of grain wagon, sometimes referred to as a gravity wagon, includes a towable chassis supporting a temporary storage container (e.g., a hopper or bin) with a discharge (e.g., a gated opening) in a lower portion of the container that allows harvested material to be unloaded via gravity. Such wagons have been widely accepted by farmers and widely produced by equipment manufacturers because of their combination of economy, versatility, production savings, and maneuverability.

In known gravity wagons, a chute may be attached to the container adjacent the discharge in order to direct grain or other material from the discharge in a desired direction (e.g., laterally outward to the side of the cart). The chute may be detachable from the container or can be adjusted between a generally upright storage or transportation position and a generally horizontal or discharge position. In known gravity wagons, a kickback is coupled to the container adjacent the chute and is configured to direct material in a desired direction, generally laterally inward towards the center of the hopper, when the chute is in the upright storage position and the discharge gate is open.

A disadvantage of known chute and kickback mechanisms is that they are heavy and must be manually positioned by an operator, which can be difficult.

SUMMARY OF THE INVENTION

The present invention overcomes the disadvantages of known gravity wagons by linking the discharge chute and the kickback so that their movements are synchronized and by using one or more pushers configured to reduce the effort needed to position the chute and kickback. In certain embodiments, the pusher or pushers are also configured to help maintain the chute and kickback in storage and discharge positions, respectively.

In accordance with a first aspect of the present invention, a grain wagon comprises a trailer and a hopper mounted on the trailer and having a discharge opening. The grain wagon further comprises a discharge chute pivotally attached to the hopper so as to rotate about a first pivot axis between a folded position in which the discharge chute extends across the discharge opening and an extended position in which the discharge chute protrudes outwardly from the discharge opening. The discharge chute is spaced from the hopper in the folded position to define a gap therebetween and has a first end portion adjacent the hopper in the extended position. The grain wagon also comprises a kickback pivotally attached to the hopper so as to rotate about a second pivot axis, the kickback extending around the first end portion of the discharge chute. The grain wagon further comprises a linkage extending between the kickback and the discharge chute to position the kickback to receive grain from the gap when the discharge chute is in the folded position. The grain wagon also comprises a pusher connected to the hopper or the trailer at a third pivot axis to exert a force at a pivot point on the kickback defining a fourth pivot axis offset from the second pivot axis. The fourth pivot axis is disposed above a plane defined by the third pivot axis and the second pivot axis when the discharge chute is in the extended position and is disposed below the plane when the discharge chute is in the folded position.

In accordance with another aspect of the present invention, the discharge chute is generally U-shaped, with a bottom panel and two side panels extending upwardly from opposite edges of the bottom panel. The first pivot axis can extend through the side panels of the discharge chute.

In accordance with another aspect of the present invention, the kickback includes a pair of side panels on opposite edges of a bottom panel. The second pivot axis can extend through the side panels of said kickback. The third pivot axis can extend through the side panels of the kickback. The pusher can connect to the kickback at a pivot on a side panel of the kickback.

In accordance with another aspect of the present invention, the third pivot axis is at about the same elevation as said second pivot.

In accordance with another aspect of the present invention, the pusher is a hydraulic cylinder.

In accordance with another aspect of the present invention, the grain wagon further comprises a latch arm pivotally attached to the discharge chute and a catch member positioned on the hopper to be engageable by the latch arm when the discharge chute is in the folded position. The latch arm can be spring-biased toward the catch member.

In accordance with another aspect of the present invention, a first end of the linkage is pivotally connected to the kickback and a second end of the linkage is pivotally connected to the discharge chute. The linkage can include a generally upright portion and a generally transverse portion connected by a bend. In accordance with another aspect of the present invention, the latch arm is coupled to a rod extending across the discharge chute and the linkage bends around said rod.

In accordance with another aspect of the present invention, the pusher has a neutral position exerting a force through the second pivot axis and the linkage has a length to cause the kickback to move the pusher from the neutral position in the folded and extended positions so that the pusher exerts an upward or downward force. In accordance with another aspect of the present invention, the pusher is configured such that when an operator moves the discharge chute from the folded position into the extended position the pusher automatically moves the chute into the extended position after the chute has been moved beyond the neutral position. In accordance with another aspect of the present invention, the pusher is configured such that when an operator moves the discharge chute from the extended position to the folded position the pusher automatically moves the chute into the folded position after the chute has moved beyond the neutral position. When the pusher automatically moves the discharge chute into the folded position, a latch arm can automatically engage a catch to maintain the discharge chute in the folded position.

In accordance with another aspect of the present invention, the discharge chute includes at least two sides, and the discharge chute is configured to be adjustable between the folded position and the extended position by an operator from any side of the discharge chute.

Other objects and advantages of the present invention will be apparent to those of ordinary skill in the art upon review of the detailed description of the preferred embodiments provided herein.

BRIEF DESCRIPTION OF THE DRAWINGS

The accompanying drawings, which are incorporated herein and for part of the specification, help illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 5 is a side view showing a chute and a kickback in a second position according to an embodiment of the present invention.

FIG. 6 is side view showing a cross-section of a chute and a kickback in a second position according to an embodiment of the present invention.

FIG. 7 is side view of a chute and a kickback in a first position according to an embodiment of the present invention.

DETAILED DESCRIPTION OF THE PREFERRED EMBODIMENTS

The present invention is directed to a gravity wagon including a discharge chute and kickback with lift and latch assembly. The gravity wagon includes a container, bin or hopper for storing grain or other material and a discharge for allowing material to exit the hopper via gravity. The discharge chute and kickback are coupled via a linkage such that they can be positioned to direct the material exiting the hopper to an area generally to the side of the hopper or an area generally towards the center of the hopper. The movement of the discharge chute and the kickback is facilitated by a pusher or pushing member coupled to the kickback. The pushing member is configured to exert a force on the kickback to facilitate the movement of the kickback and chute from the first position to the second position.

More specifically, the hopper is configured to store grain or other material and the discharge can be a gated opening near the bottom of the hopper. The chute can be coupled to the gravity hopper at a position adjacent a bottom of the discharge. The chute can be adjusted from an extended position in which it is approximately horizontal or angled downwardly to a folded position in which it is approximately upright or parallel to a side of the hopper. In the extended position, the chute is configured to receive material from the discharge opening and direct it to an area generally to the side of the gravity wagon. In the folded position, the chute extends across the discharge but is spaced therefrom to define a gap so that, if the gate is open, the chute directs material from the discharge opening to the kickback via the gap. The kickback is positioned approximately below the chute, and it can be adjusted from a first position to a second position in which it is configured to receive material and direct it to an area generally towards the center of the gravity wagon. The linkage couples the chute and kickback such that when the chute is in the extended position, the kickback is in the first position and when the chute is in the folded position, the kickback is in the second position. The linkage is configured such that the movements of the chute and the kickback are synchronized. The pushing member is coupled to the hopper and to the kickback. The pushing member facilitates the movements of the kickback and the chute by providing a force to assist a user manually adjusting the position of the chute and kickback. The gravity wagon can also include a spring loaded latch configured to maintain the chute and the kickback in a second position. The spring loaded latch is configured to detachably couple with a protrusion on the hopper.

Figure 1:
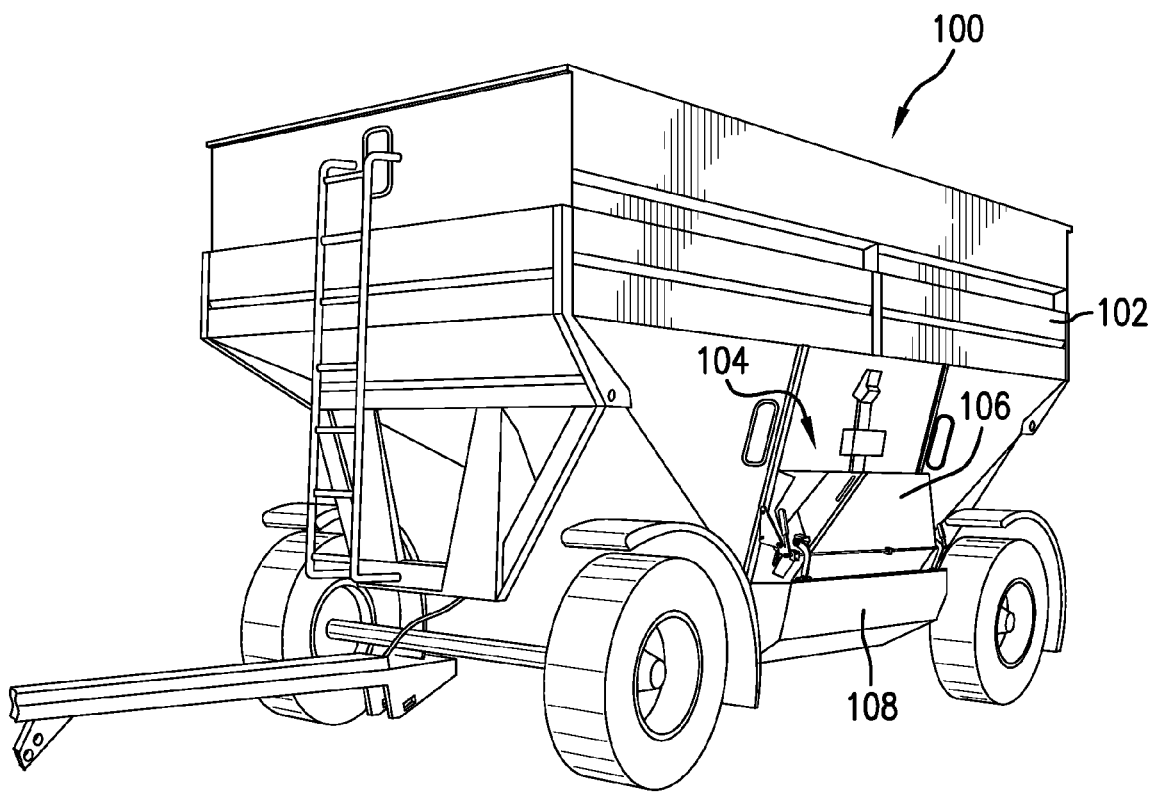
FIG. 1 is a perspective view showing a gravity wagon with a hopper, chute and kickback according to an embodiment of the present invention.

FIG. 1 shows a gravity wagon 100 with a discharge chute 106 and kickback 108 according to an embodiment of the present invention. The gravity wagon includes a container or hopper 102 and a discharge 104. The hopper 102 is configured to store material such as grain. As shown, the hopper can be mounted on a trailer 105 to be towed behind a tractor or the like. The discharge 104 is a gated opening disposed at or near a bottom of the hopper and configured, when the gate is open, to allow material to exit the hopper 102 via gravity. The chute 106 is coupled to the hopper 102 at a first pivot 107 adjacent a bottom of the discharge 104. The kickback 108 is coupled to the hopper 102 at a second pivot 109 approximately below the discharge 104 and chute 106. As shown in FIG. 1, the chute 106 and kickback 108 are in a folded and second position, respectively, which will be described in further detail with reference to FIG. 3, below.

FIG. 1 shows the chute 106 and kickback 108 with a discharge 104 for a towable grain wagon 100. However, the chute 106 and kickback 108 can be used with any farm implement having a gravity discharge.

Figure 2:
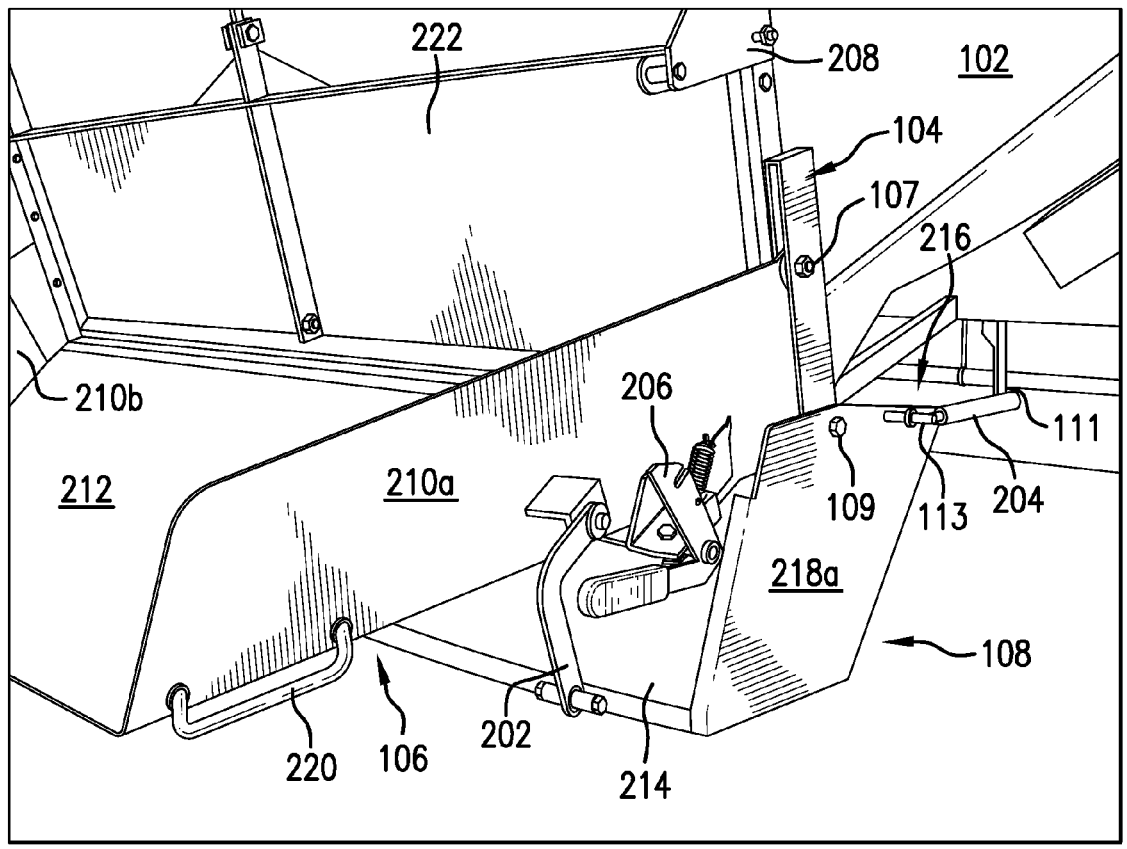
FIG. 2 is a perspective view showing a chute and a kickback in a first position according to an embodiment of the present invention.

FIG. 2 shows a perspective view of the chute 106 and the kickback 108 in an extended and first position, respectively, according to an embodiment of the present invention. As shown in FIG. 2, the wagon 100 includes a linkage 202, a pusher or pushing member 204 and a latch 206. Linkage 202 couples the chute 106 and the kickback 108. A first end of the linkage 202 is coupled to the chute 106, and a second end of the linkage is coupled to the kickback 108. The linkage 202 is configured to synchronize the movements and positions of the chute 106 and kickback 108, e.g., the linkage 202 positions the kickback 108 in a second position if the chute 106 is in a folded position and the linkage 202 causes the chute 106 to move into an extended position from a second position if the kickback 108 is moved from a first position to a second position. In an embodiment of the present invention, there is a second linkage 302 (see FIG. 3) at an opposite side of the chute 106 and kickback 108. In an embodiment of the present invention, the linkage 202 can be an L-shaped member with a generally upright portion and a generally transverse portion connected by a bend, the member being pivotably connected at opposite ends to the chute and the kickback, respectively. In other embodiments of the present invention, the linkage 202 can be a track and button, a cable and pulley, a slot and peg, roller or bearing.

The pusher or pushing member 204 can be coupled to the kickback 108 to facilitate movement of the kickback 108 and chute 106. In an embodiment of the present invention, the pushing member 204 can be a gas cylinder, a hydraulic cylinder, a linear actuator, a compression spring with a telescoping rod or any other force applicator. A first end of the pushing member 204 is pivotably coupled to the hopper 102 at a third pivot 111, and a second end is pivotably coupled to the kickback 108 at a fourth pivot 113 radially offset from the second pivot 109. As the pushing member 204 extends, it exerts a force on the kickback 108 that facilitates the movement of the kickback 108 into a first or second position, which in turn moves the discharge chute 106 into an extended or folded position, respectively (or vice versa). The pushing member 204 can also act as a dampener when it is contracting and, thus, reduce the force necessary to control the chute 106 and kickback 108. The pushing member 204 greatly reduces the force necessary for operators to manually lift the position of the chute 106 and kickback 108. In an embodiment of the present invention, more than one pushing member 204 can be connected to the kickback 108. In an embodiment of the present invention, the weight of the chute 106 is about 54 pounds and the weight of the kickback 108 is about 68 pounds. The pushing member 204 must exert enough force to assist in the movement of these components. In an embodiment of the present invention, the pushing member must exert enough force to maintain them in the desired position.

As illustrated in FIGS. 5, 6 and 7, in an embodiment of the present invention, the kickback is coupled with the hopper at the second pivot 109 defining a second pivot axis, and the pushing member is coupled at a first end with the hopper at a pivot 111 defining a third pivot axis and at a second end with the kickback at a pivot defining a fourth pivot axis 113. In an embodiment, the pushing member 204 can be positioned such that, when the chute is in the folded position, the fourth pivot 113 is radially offset from and below the second pivot 109 and, when the chute is in the extended position, the fourth pivot 113 is radially offset from and above the second pivot 109. In an embodiment, the fourth pivot 113 is disposed below the line defined by the second and third pivots 109 & 111 (or the plane defined by the second and third pivot axes) when the chute is in the folded position and is disposed above the line defined by the second and third pivots (or the plane defined by the second and third pivot axes) when the chute is in the extended position. Thus, when the chute is in the folded position, the pushing member applies a torque to the kickback tending to hold the chute and kickback in the folded and second positions, respectively. Similarly, when the chute is in the extended position, the pushing member applies a torque in an opposite direction tending to hold the chute and kickback in the extended and first positions, respectively. In an embodiment, the pusher is configured such that the second, third and fourth pivots 109, 111 & 113 become collinear as the kickback is moved between the first and second positions, such that the pusher is in a neutral position or state wherein no torque is applied to the kickback. However, once the kickback is moved in either direction (i.e., toward the first or second position) beyond the neutral position, the pusher will help complete movement of the kickback into the first or second position, respectively. In the embodiment shown, the first end of the pushing member 111 is below the second end of the pushing member 113 in the folded and first position (FIG. 7) and above the second end 113 in the extended and second position (FIGS. 5 and 6). The length of the pushing member 204 is also important to ensure it can retract enough to allow the point 113 to move above or below level with respect to point 111 and point 109. This configuration is advantageous because the pushing force exerted by the pushing member 204 will maintain the kickback 108 and the chute 106 in the folded position or the extended position.

The latch arm 206 is coupled to the chute 106 and is configured to maintain the chute 106 in a folded position. The latch arm 206 is configured to detachably couple with a catch, which can be a protrusion, such as a knob, when the chute 106 is in a folded position. The latch arm 206 can be manually uncoupled from the catch to allow the chute 106 to be moved from the folded position. The latch arm 206 is advantageous because, unlike the chain and hooks generally used, it does not require a mechanical advantage to hold the chute 106 in place. This allows the latch arm 206 to be placed in a wide range of locations on the chute 106. In an embodiment of the present invention, the latch arm 206 is placed close to the bottom of the chute for the convenience of the operator. In an embodiment of the present invention, the latch arm 206 is coupled to the sidewall of the chute 210 via a bushing and the latch arm 206 functions to stiffen the chute 106, which further reduces noise during transport and increases the strength of the chute 106 during use.

In an embodiment of the present invention, a bracket 208 including a catch is coupled to the hopper 102 and the latch 206 is configured to couple with the catch on the bracket 208. In an embodiment of the present invention, a second latch arm 306 (see FIG. 3) can be coupled to the chute 106 at an opposite end and a coupling link 308, such as a rod, can synchronize the coupling and uncoupling of the latches to the hopper 102. In an embodiment of the present invention, the linkages 202 are configured to avoid the coupling link 308 in the second position (see FIG. 3). The latch arm 206 is described in further detail with reference to FIG. 4, below.

In an extended position, the chute 106 protrudes outwardly from a bottom of the discharge 104 and a first end portion of the chute 106 is adjacent the discharge 104 in this position. In an embodiment of the present invention, the chute 106 extends from the discharge at an angle beyond horizontal, i.e., the chute 106 is angled slightly downward. In the first position, the chute 106 is positioned to receive material exiting the discharge 106 and direct the material to an area generally to the side of the wagon 100. As shown in FIG. 2, the chute 106 can be generally U-shaped, and include sidewalls or panels 210a and 210b configured to prevent material from flowing over the sides of the chute 106. In an embodiment of the present invention, the sidewalls or panels 210a and 210b of the chute 106 can be tapered. In an embodiment, the pivot axis defined by the first pivot 107 can extend through the sidewalls as shown.

The kickback 108 is positioned approximately below the chute 106. The kickback 108 is an approximately L-shaped member including a first member 214, a second member 216 and sidewalls 218a and 218b enclosing the ends of the L-shaped member. The sidewalls 218a and 218b of the kickback 108 are pivotably coupled to the hopper 102. In an embodiment, the pivot axis defined by the second pivot 109 extends through the sidewalls.

In an embodiment of the present invention, the chute 106 includes a handle 220. The handle 220 is coupled to the exterior of a sidewall 210a. The handle 220 is configured to be gripped by a user while adjusting the position of the chute 106. In an embodiment of the present invention, the chute 106 includes handles on both sides and a user can adjust the position of the chute 106 from either side. Alternatively, or in addition to handle 220, one or more handles can be provided on the kickback.

In an embodiment of the present invention, the discharge 104 of wagon 100 can include a gate or door 222 for controlling the flow of material through the discharge opening. The door 222 can be adjustable between an open and closed position. In an open position, material is allowed to exit the hopper 102 through the opening 104 via gravity.

Figure 3:
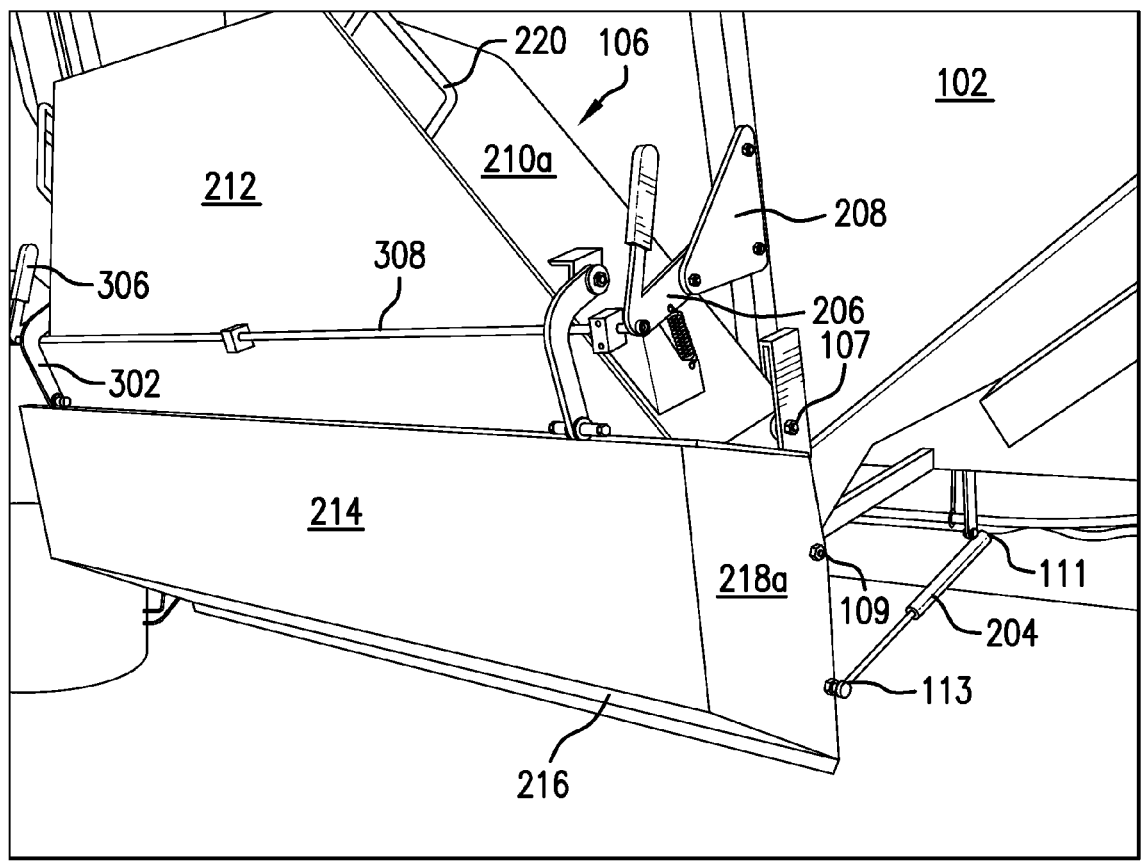
FIG. 3 is a perspective view showing a chute and a kickback in a second position according to an embodiment of the present invention.

FIG. 3 shows a perspective view of the chute 106 and the kickback 108 in folded and second positions, respectively, according to an embodiment of the present invention. In a folded position, the chute 106 is approximately upright and positioned over the opening 104. In the folded position, the chute 106 is spaced from the hopper 102 to define a gap therebetween. The chute 106 is configured to direct material exiting the opening 104 in a generally downward direction to the kickback 108. The kickback 108 is in a generally upward position in which a first portion 214 of the kickback overlaps with the first end portion of the chute 106 and a second portion 216 of the kickback is angled slightly downward from horizontal. The sidewalls of the chute 106 and the kickback 108 overlap such that material exiting the opening 104 cannot flow out the sides of the chute 106 or kickback 108. The material discharged by the kickback 108 in the second position will be directed generally underneath and towards the center of the wagon 100 by the second portion 216.

Figure 4:
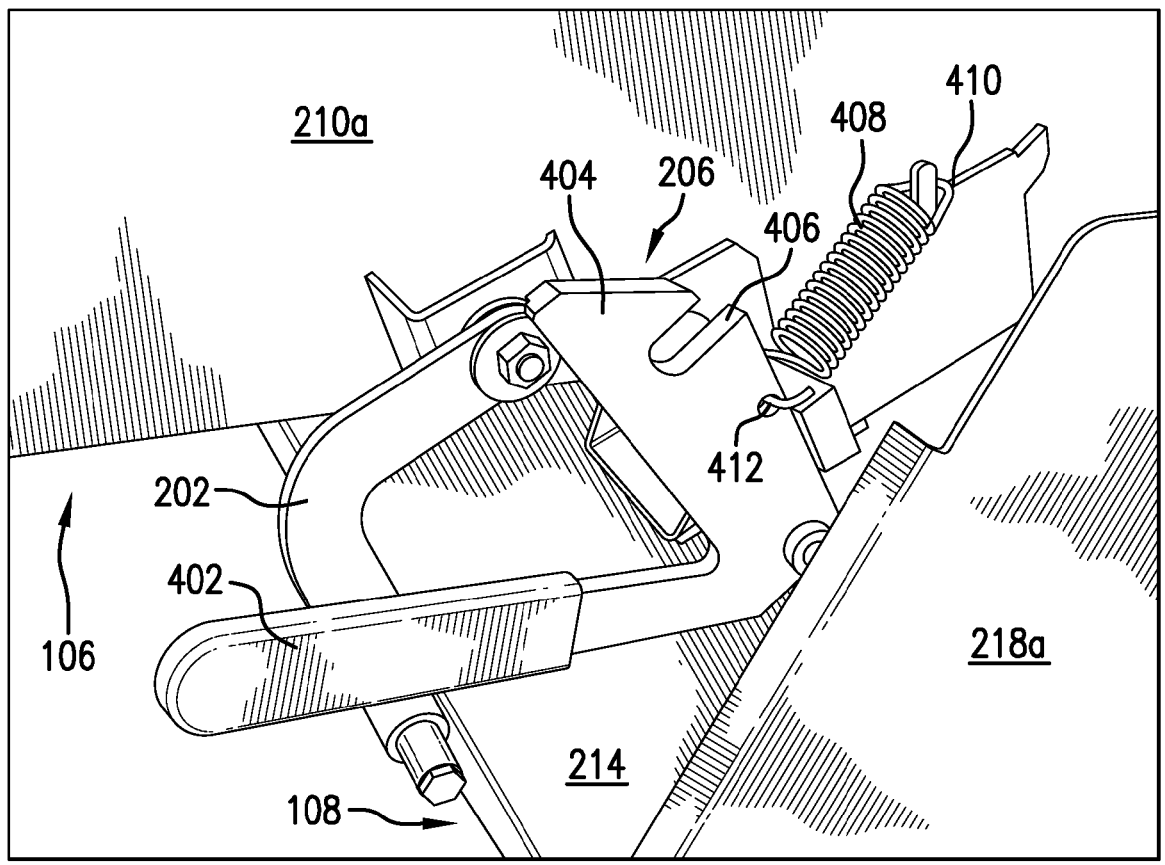
FIG. 4 is a perspective view showing a latch and a linkage according to an embodiment of the present invention.

FIG. 4 shows a perspective view of a latch arm 206 and a linkage 202 according to an embodiment of the present invention. The latch arm 206 includes a handle 402, a coupling member 404 including an opening 406 and a spring 408. The latch arm 206 is pivotably coupled to the chute 106. The handle 402 is configured to allow a user to pivot the latch 206. The coupling member 404 is configured to couple with the hopper 102. Specifically, the opening 406 in the coupling member 404 is configured to couple with a protrusion on the hopper 102. The spring 408 is configured to maintain the latch arm 206 in a coupled position. The spring 408 is coupled with the chute 106 at a first end 410 and with the latch arm 206 at a second end 412.

FIG. 5 shows a side view of the chute 106 and the kickback 108 in the second position according to an embodiment of the present invention. As can be seen in greater detail, the pushing member 204 can be positioned such that the first end 111 is positioned above the second end 113 in the second position. The pushing force of the pushing member 204 essentially lifts the chute 106 and the kickback 108, which maintains the chute 106 and kickback 108 in their folded and second positions, respectively.

FIG. 6 shows a side view of a cross-section of the chute 106 and kickback 108 in the second position according to an embodiment of the present invention. As can be seen in greater detail, the relative positions of the pivots of the rotating components are important to the function of the present invention. In an embodiment of the present invention, the kickback 108 is rotatably coupled to the hopper 102 at the bottom corner of the hopper 109 and approximately two-thirds the way up the sidewall 218 of the kickback 108. The chute 106 is rotatably coupled to the hopper 102 at a point just below the discharge 107 and on the sidewall 210 of the chute 106. The linkage 202 is rotatably coupled to a point on the kickback 602 approximately below the point it is coupled to the chute 604.

FIG. 7 illustrates a side view of a chute 106 and kickback 108 in the first position according to an embodiment of the present invention. As can be seen in greater detail, the first end of the pushing member 111 is positioned below the second end 113 in the first position. The pushing force exerted by the pushing member 204 essentially lifts the back corner of the kickback 108 towards the hopper 102, which maintains the kickback 108 and the chute 106 in the first position.

In an embodiment of the present invention, a neutral position is a position in which the first end 111 and the second end 113 of the pushing member are linearly aligned with the second pivot 109. When the chute 106 is adjusted from a first position to a second position, the pushing member 204 is configured to automatically, i.e., without any assistance from an operator, move the chute 204 into the first position after an operator has moved the chute 204 beyond a neutral position. When the chute 106 is adjusted from a second position to a first position, the pushing member 204 is configured to automatically, i.e., without any assistance from an operator, move the chute 204 into the second position after an operator has moved the chute 204 beyond a neutral position.

In an alternative embodiment of the present invention, the kickback 108 is omitted and the pushing member 204 is coupled directly to the chute 106. As before, one end of the pushing member 204 is coupled to the hopper (or trailer) at pivot 111, which defines a second pivot axis. However, in this embodiment, shown by broken lines in FIGS. 5-7, the opposite end of the pushing member is connected to the chute 106 at a pivot 502, which defines a third pivot axis (the chute pivot axis 109 defining a first pivot axis). This configuration reduces the force necessary to manually lift the chute 106. Similarly to the configuration of the pushing member 204 described above with respect to the kickback 108, the pushing member 204 can be configured to automatically, i.e., without any assistance from an operator, move the chute 204 into the folded position or the extended position after an operator has moved the chute 204 beyond a neutral position, i.e., a position at which point 502 and the second end of the pushing member 113, the first end of the pushing member 111 and the pivot of the chute 107 are collinear. In other words, the pushing member is configured such that, when chute 107 is in the folded position, pivot 502 is below the plane defined by the first and second pivots; and, when the chute is in the extended position, pivot 502 is above the plane defined by the first and second pivots.

From the above it will be appreciated that the chute and kickback system of the present invention allows a user to synchronously adjust the position of the chute and kickback to unload the discharged material in a desired direction, with the force required to adjust the position of the chute and kickback being greatly reduced. It will also be appreciated that the spring loaded latch in some embodiments helps maintain the chute and kickback in a desired position while freeing an operator's hands for other tasks. It will also be appreciated that various changes can be made to the system without departing from the spirit and scope of the appended claims. For example, the kickback could have a curved shape rather than an L-shape as shown. Additionally, while the handle on the chute is shown as a generally U-shaped member attached to the chute at two locations/ends, it will be appreciated that the handle can be generally L-shaped (i.e., attached to the chute at one end only), can be defined by an opening in a member connected to the chute, can be a strap or loop connected to the chute, or have any other configuration which can be securely grasped by an operator. Also, while the pusher has been described as extending from the hopper to the kickback, it will be appreciated that the pusher can be positioned to extend from pivoting connections on the frame of the trailer or the chute. Furthermore, the pusher can exert a "pushing force" at the fourth pivot as shown, or an equal, but opposite, "pulling" force from an opposite side of the kickback, to achieve the same effect. Further yet, while the invention is described for use with a farm container mounted on a trailer, it will be appreciated that any mobile container with a gravity discharge can benefit from the invention, including without limitation, self-propelled farm implements with storage containers having gravity discharges. It will also be appreciated that the present invention can be modified to automate the process of repositioning the chute and kickback by use of one or more electronically controllable pushers or actuators and a control circuit responsive to operator input to control the actuators to move the chute and kickback in the manner described herein. Such control circuit can include an operating panel with controls disposed adjacent the chute and kickback assembly or the operating panel can be located remotely in the cab of a tractor or the like via wired or wireless connections. Power for operating such an automated system can be provided by an onboard power source, such as batteries and/or a generator, or from a standard power take-off (PTO) connection with a tractor. Also, while the discharge has been shown as a manually-operated gated opening with a single gate slidable up and down in a generally vertical direction, it will be appreciated that the gate can be comprised of more than one blade member, can be slidable horizontally or in other directions, can be one or more hinged or pivoting doors, can be configured to be operated remotely by use of hydraulic, pneumatic or electrically actuated pushers, or any combination of the foregoing. In an embodiment, the positions of the gated opening and the chute/kickback assembly are all controllable by the operator using a control panel adjacent the discharge, in the cabin of a tractor towing the wagon, or elsewhere in relation to the wagon. These and other modifications are intended to be encompassed within the scope of the appended claims.

The invention claimed is:

1. A grain wagon comprising:
   a trailer;
   a hopper mounted on said trailer and having a discharge opening;
   a discharge chute attached to said hopper at a first pivot defining a first pivot axis about which said discharge chute is rotatable between a folded position in which said discharge chute extends across said discharge opening and an extended position in which said discharge chute protrudes outwardly from said discharge opening, said discharge chute being spaced from said hopper in said folded position to define a gap therebetween;
   a kickback attached to said hopper at a second pivot defining a second pivot axis about which said kickback is rotatable between a first position in which said kickback extends from a bottom of said gap towards a center of said trailer and a second position;
   a linkage extending between said kickback and said discharge chute, said linkage being configured to cause said kickback to assume said first position when said discharge chute is in said folded position; and
   a pusher connected at a first end to said hopper or said trailer at a third pivot defining a third pivot axis and at a second end to said kickback at a fourth pivot defining a fourth pivot axis, said fourth pivot axis being disposed above a plane defined by said third pivot axis and said second pivot axis when said discharge chute is in said extended position and being disposed below said plane when said discharge chute is in said folded position.

2. A grain wagon as set forth in claim 1, wherein said discharge chute is generally U-shaped, with a bottom panel and two side panels extending upwardly from opposite edges of said bottom panel.

3. A grain wagon as set forth in claim 2, wherein said first pivot axis extends through said side panels of said discharge chute.

4. A grain wagon as set forth in claim 1, wherein said kickback includes a pair of side panels on opposite edges of a bottom panel.

5. A grain wagon as set forth in claim 4, wherein said second pivot axis extends through said side panels of said kickback.

6. A grain wagon as set forth in claim 5, wherein said fourth pivot axis extends through said side panels of said kickback.

7. A grain wagon as set forth in claim 6, wherein said fourth pivot is disposed on a side panel of said kickback.

8. A grain wagon as set forth in claim 1, said third pivot axis is at about the same elevation as said second pivot axis.

9. A grain wagon as set forth in claim 1, wherein said pusher is a hydraulic cylinder.

10. A grain wagon as set forth in claim 1, further comprising a latch arm pivotally attached to said discharge chute and a catch member positioned on said hopper to be engageable by said latch arm when said discharge chute is in said folded position.

11. A grain wagon as set forth in claim 10, wherein said latch arm is spring-biased toward said catch member.

12. A grain wagon as set forth in claim 1, wherein a first end of said linkage is pivotally connected to said kickback and a second end of said linkage is pivotally connected to said discharge chute.

13. A grain wagon as set forth in claim 12, wherein said linkage includes a generally upright portion and a generally transverse portion connected by a bend.

14. A grain wagon as set forth in claim 10, wherein said latch arm is coupled to a rod extending across said discharge chute and said linkage bends around said rod.

15. A grain wagon as set forth in claim 1, wherein said pusher has a neutral position wherein said second, third and fourth pivots are collinear.

16. A grain wagon as set forth in claim 15, wherein said pusher is configured such that when an operator moves said discharge chute from said folded position into said extended position said pusher automatically moves the chute into said extended position after said discharge chute has been moved beyond said neutral position.

17. A grain wagon as set forth in claim 15, wherein said pusher is configured such that when an operator moves said discharge chute from said extended position to said folded position said pusher automatically moves said chute into said folded position after said discharge chute has moved beyond said neutral position.

18. A grain wagon as set forth in claim 17, wherein when said pusher automatically moves said discharge chute into said folded position a latch arm automatically engages a catch to maintain said discharge chute in said folded position.

19. A grain wagon as set forth in claim 1, wherein said discharge chute includes at least two sides, and said discharge chute is configured to be adjustable between said folded position and said extended position by an operator from either side of said discharge chute.

20. A grain wagon comprising:
    a trailer;
    a hopper mounted on said trailer and having a discharge opening;
    a discharge chute attached to said hopper at a first pivot defining a first pivot axis about which said discharge chute is rotatable between a folded position in which said discharge chute extends across said discharge opening and an extended position in which said discharge chute protrudes outwardly from said discharge opening; and
    a pusher connected at a first end to said hopper or said trailer at a second pivot defining a second pivot axis and at a second end to said discharge chute at a third pivot defining a third pivot axis, said third pivot axis being disposed above a plane defined by said first pivot axis and said second pivot axis when said discharge chute is in said extended position and being disposed below said plane when said discharge chute is in said folded position.

21. A grain wagon as set forth in claim 20, wherein said pusher is configured to have a neutral position wherein said first, second and third pivots are collinear.

22. A grain wagon as set forth in claim 21, wherein said pusher is configured such that when an operator moves said discharge chute from said folded position into said extended position said pusher automatically moves the chute into said extended position after said discharge chute has been moved beyond said neutral position.

23. A grain wagon as set forth in claim 21, wherein said pusher is configured such that when an operator moves said discharge chute from said extended position to said folded position said pusher automatically moves said chute into said folded position after said discharge chute has moved beyond said neutral position.

* * * * *